United States Patent [19]

Rotem et al.

[11] Patent Number: 4,835,691

[45] Date of Patent: May 30, 1989

[54] POSITIONING SYSTEM PARTICULARLY USEFUL FOR POSITIONING AGRICULTURAL IMPLEMENTS

[75] Inventors: Abraham Rotem; Etan Silberg, both of Haifa; Shaul Israeli, Ramat-Gan, all of Israel

[73] Assignee: Sentop Ltd., Haifa, Israel

[21] Appl. No.: 95,072

[22] Filed: Sep. 11, 1987

[51] Int. Cl.$^4$ .............................................. G06F 15/50
[52] U.S. Cl. ........................... 364/424.02; 364/424.07; 180/168
[58] Field of Search ..................... 364/424; 239/77, 78, 239/722, 743; 47/1.5, 1.7, 2; 118/323, 663, 668, 672; 180/167, 168, 169; 250/202

[56] References Cited

U.S. PATENT DOCUMENTS 4,069,888 10/1978 Wolters et al. ...................... 180/169
4,482,960 11/1984 Pryor ............................. 250/202 X Primary Examiner—David Mis
Attorney, Agent, or Firm—Benjamin J. Barish

[57] ABSTRACT

A positioning system for positioning a movable body, such as an agricultural implement, with respect to a reference path constituted of at least one line of objects or a linear object, such as rows of crops. The system comprises a signal-echo distance-measuring device on the movable object and including a receiver for receiving an input signal representing the distance of the movable object in one direction from the reference path, and an input signal representing the distance of the movable object in the opposite direction from the reference path. The system compares both measured distances, and positions the movable object towards or away from the reference path to equalize the two measured distances.

20 Claims, 5 Drawing Sheets

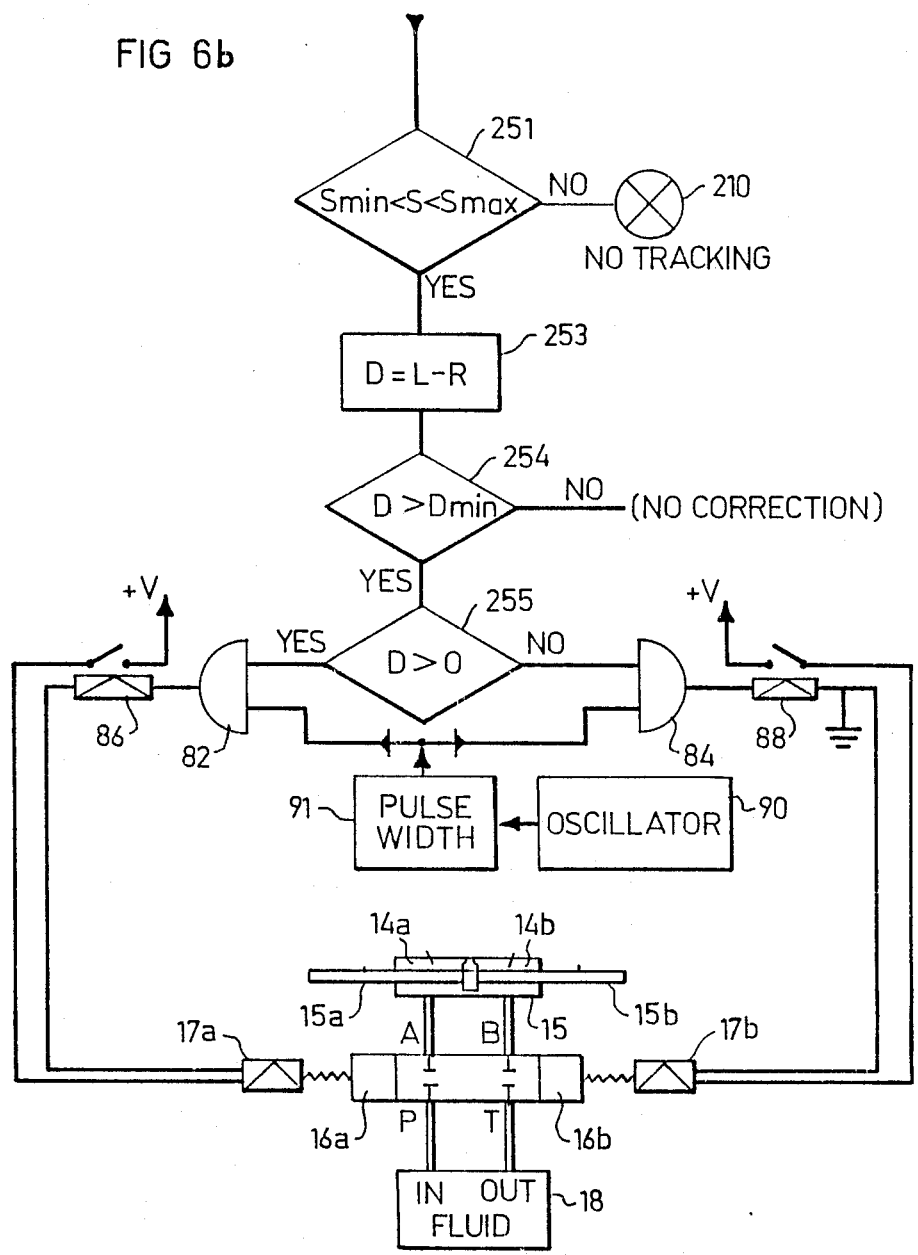

POSITIONING SYSTEM PARTICULARLY USEFUL FOR POSITIONING AGRICULTURAL IMPLEMENTS

BACKGROUND OF THE INVENTION

The present invention relates to positioning systems for positioning a movable body with respect to a reference path. The invention is particularly useful for positioning agricultural implements with respect to one or more rows of crops, and is therefore described below with respect to this application.

Efforts are continuously being made to streamline the production of row crops, in order to reduce the operating expenses and also to increase the yields. Both operating expenses and crop yields are substantially affected by the proximity at which agricultural implements can approach the plant rows, without causing damage, during various farming operations, such as uprooting of weeds from the vicinity of plants, spraying the plants, and fertilizing the ground. For these reasons, various precision farming tools have been developed for use during sowing of seeds which permit more efficient cultivation and which reduce considerably the operating expenses. However, the agricultural equipment now available usually can operate no closer than about 10 cm from the plant on level ground without danger of damaging the plants.

As a partial solution to this problem, some agricultural implements include independent guidance systems which are guided by an additional worker in addition to the tractor driver. However, such guidance systems not only require an extra worker, but also are subject to human judgement and control, and therefore require significant response times and are limited as to the closeness to which the agricultural implement can approach the plant crops without danger of damaging them.

BRIEF SUMMARY OF THE INVENTION

An object of the present invention is to provide a positioning system for positioning a movable body with respect to a reference path. A more particular object of the invention is to provide a positioning system particularly useful for positioning an agricultural implement with respect to a reference path defined by one or more rows of crops, so as to enable the agricultural implement to approach the crops substantially closer, and at relatively higher speed, than heretofore possible, without danger of damaging the crops.

According to a broad aspect of the present invention, there is provided a positioning system for positioning a movable body with respect to a reference path along which it moves and constituted of at least one line of objects or one linear object, comprising: a signal-echo distance-measuring device to be located on the movable object and including receiver means for receiving two input signals, one input signal representing the distance of the movable object in one direction from the reference path, and the other input signal representing the distance of the movable object in the opposite direction from the reference path; comparing means for comparing both measured distances; a positioning device for positioning the movable object towards or away from the reference path; and a control system controlling the positioning device in response to the comparing means for controlling the movable object to equalize the two measured distances.

The reference path may be defined by two lines of objects (e.g., rows of crops) or two linear objects (e.g., walls), the positioning device positioning the movable body precisely centered with respect to the two lines of objects o the two linear objects. Alternatively, the reference path may be defined by a single line of objects or a single linear object, in which case the movable body would straddle the single line of objects or the single linear object, and would be moved so as to maintain the line of objects or linear object precisely centered with respect to the movable body.

As indicated earlier, the invention is particularly useful in applications wherein the movable body is an agricultural implement, and the reference path is constituted of one or more rows of crops. In the preferred embodiments described below for purposes of example, the agricultural implement is used with a plurality of rows of crops and is positioned so that its signal-echo distance measuring device is always precisely centered between two of such rows of crops.

In the preferred embodiments of the invention described below, the signal-echo distance-measuring device is a pulse-echo system transmitting a pulse and measuring the transit time for its echo to be received in order to measure the distance. However, the distance measuring device could also be of the variable-frequency type measuring the change in frequency which occurs during the transit time from transmitting the reference signal to receiving the echo, or of the variable-amplitude type measuring the difference in amplitude during this transit time, both of which are well known in distance-measuring systems. In the described preferred embodiment, the transmitted signals and received echos are sonar pulses, but it is contemplated that electromagnetic reference signals, e.g., radar pulses, could also be used in the distance-measuring device.

The invention is particularly applicable when the positioning system is mounted on the agricultural implement to be towed by a tractor between rows of crops. It has been found that the positioning system permits the agricultural implement to approach as close as 3 cm to the crop rows without danger of damaging the plants even when the tractor deviates slightly from the center or when side slopes are present between the crop rows. The system is fast-acting, simple, reliable, inexpensive, and suitable for all kinds of row crops and for all stages in the growth of the crops. Moreover, the system is relatively insensitive to changing conditions in the rows of crops, for example where a row or part of a row is absent, or where the plant density in any particular row varies considerably.

Further features and advantages will be apparent from the description below.

BRIEF DESCRIPTION OF THE DRAWINGS

The invention is herein described, by way of example only, with reference to the accompanying drawings, wherein:

FIGS. 6a and 6b together constitute a block diagram, similar to FIG. 4, but illustrating a different implementation of the control box of FIG. 4.

DESCRIPTION OF PREFERRED EMBODIMENTS

Embodiment of FIGS. 1–4

Figure 1:
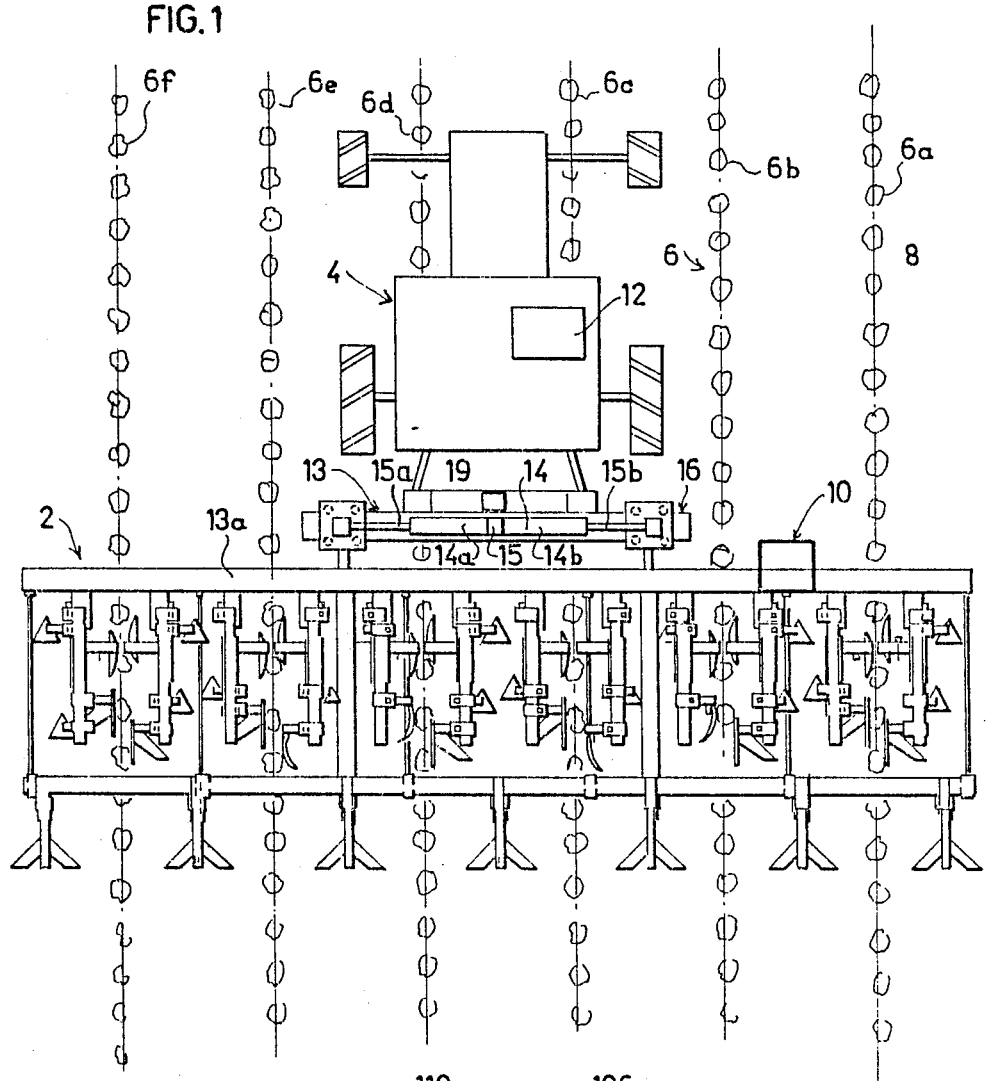
FIG. 1 is a top plan view illustrating a positioning system in accordance with the present invention for positioning an agricultural implement of any type between a plurality of rows of crops.

With reference first to FIG. 1, there is illustrated an agricultural implement, generally designated 2, towed by a tractor 4 between a plurality of rows of crops 6a–6f to be treated or worked in some manner by the agricultural implement 2. For purposes of example, the agricultural implement 2 is shown as a cultivator for working the crops, but it could be a weed-uprooting device for uprooting weeds adjacent to the crops, a spraying device for spraying the crops, a fertilizing device for applying a fertilizer material to the ground adjacent to the crops, or other form of agricultural implement. The efficiency of the process performed by the agricultural implement 2 with respect to the crops depends, to a great extent, on how close the agricultural implement can approach the rows of crops without damaging the plants in any row. The present invention provides a positioning system which automatically and continuously positions the agricultural implement 2 so as to maintain the cultivators exactly centered between two adjacent rows of the crops.

In the example illustrated in FIG. 1, the two adjacent rows defining the reference path are the two end rows 6a, 6b. Since all the rows 6a–6f are precisely spaced equal distances from each other, it will be appreciated that positioning the agricultural implement 2 with respect to the two end rows 6a, 6b will also precisely position the agricultural implement with respect to all the remaining rows 6c–6f.

The positioning system illustrated in FIG. 1 comprises a distance-measuring unit, generally designated 10, mounted on the agricultural implement 2, for measuring the distance to the two rows of crops 6a, 6b on the opposite sides of unit 10; a control unit, generally designated 12, mounted on the towing tractor 4; and a positioning device, generally designated 13, for positioning the agricultural implement so as to maintain its precisely positioned with respect to the two rows 6a, 6b, and thereby with respect to all the rows 6a–6f, as it is towed by the tractor 4.

In the described example, the agricultural implement 2 is carried on a boom 13a extending transversely across all the rows of the crops 6a–6f and is movable by the positioning device 13 in either direction along the boom in order to precisely position itself with respect to the crop rows. For this purpose, the positioning device 13 includes a cylinder 14 having a piston 15 movable therein defining a pair of chambers 14a, 14b on opposite sides of the piston. As will be described more particularly below with respect to FIG. 4, fluid is applied to the two chambers 14a, 14b so as to move piston in one or the other direction in cylinder 14. Piston 15 is coupled by two piston rods 15a, 15b, to the agricultural implement 2 to move it along the boom 13a under the control of the fluid applied to the two chambers 14a, 14b. This will be more particularly described below with respect to FIG. 4.

As will also be described below, the distance-measuring unit 10 and the control unit 12 control the positioning device 13 so as to maintain the agricultural implement 2 exactly centered between all the rows 6a–6f of crops even should a part of one of the sensed rows 6a, 6b be missing, or even should the density of the crops of a sensed row 6a, 6b vary over a large range.

Figure 2:
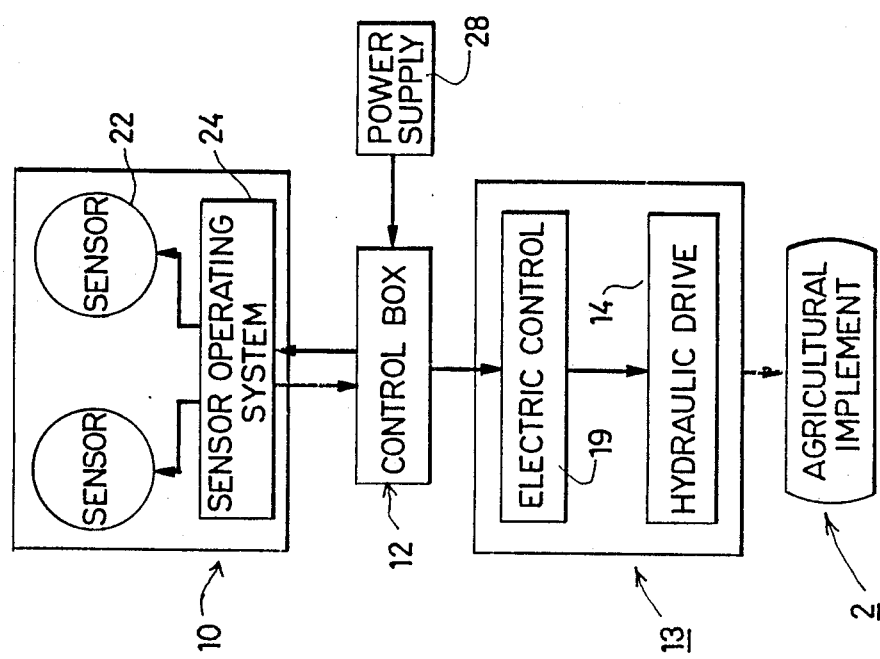
FIG. 2 is a block diagram of the positioning system of FIG. 1.

FIG. 2 is a block diagram illustrating the positioning system mounted on the agricultural implement 2 of FIG. 1. Briefly, the distance-measuring device 10 includes two sensors 21, 22 of the pulse-echo type, and a sensor operating system 24 controlling the sensors 21, 22, such that the two sensors: transmit pulses perpendicularly, in both directions, to the direction of travel of the agricultural implement; receive their echoes; and measure the transit time between the time of transmission of the pulses and the reception of their echoes, in order to compute the distance to the sensed crop rows 6a, 6b.

The distance-measuring unit 10 transmits the signals used for determining the distances to the two sensed rows of crops 6a, 6b to the control unit 12 where the signals are processed for determining the relative position of the agricultural implement 2 with respect to the reference path defined by these two rows of crops. According to this determination, commands are sent to the positioning device 13 in order to maintain the implement exactly centered between the two sensed rows of crops 6a, 6f, and thereby between all the crop rows 6a–6f.

Figure 3:
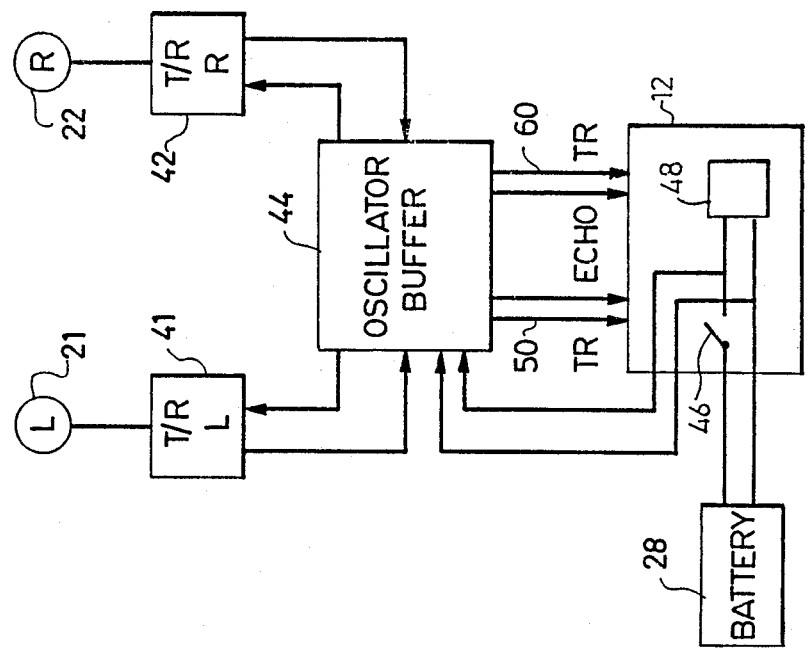
FIG. 3 is a block diagram of the pulse-echo distance-measuring device used in the positioning system of FIGS. 1 and 2.

The distance-measuring unit 10 of FIG. 2 is more particularly illustrated in FIG. 3. Its two sensors 21, 22 are of the sonar pulse-echo type. Each sensor defines a separate channel, sensor 21 defining the L-channel (Left), and sensor 22 defining the R-channel (Right). Each sensor has an operating circuit, designated 41 and 42 respectively, controlled by an oscillator and buffer circuit 44, to enable each sensor to measure the distance to the adjacent row of crops 6a, 6b (FIG. 1) by transmitting pulses to the crop row, receiving their echoes from the crop row, and measuring the transit time between the time of transmission of the pulses and reception of their echoes. Information concerning the time of transmission of the pulses and the reception of their echoes is inputted into the control unit 12 for processing, as will be described more particularly below with reference to FIG. 4. Control unit 12 is supplied by a power supply 28 which may be the battery of the tractor 4 (FIG. 1) towing the agricultural implement. The control unit 12, as well as the oscillator-buffer unit 44, is supplied from battery 28 via an on/off switch 46, and the voltage for unit 12 is regulated by a voltage regulator 48.

Figure 4:
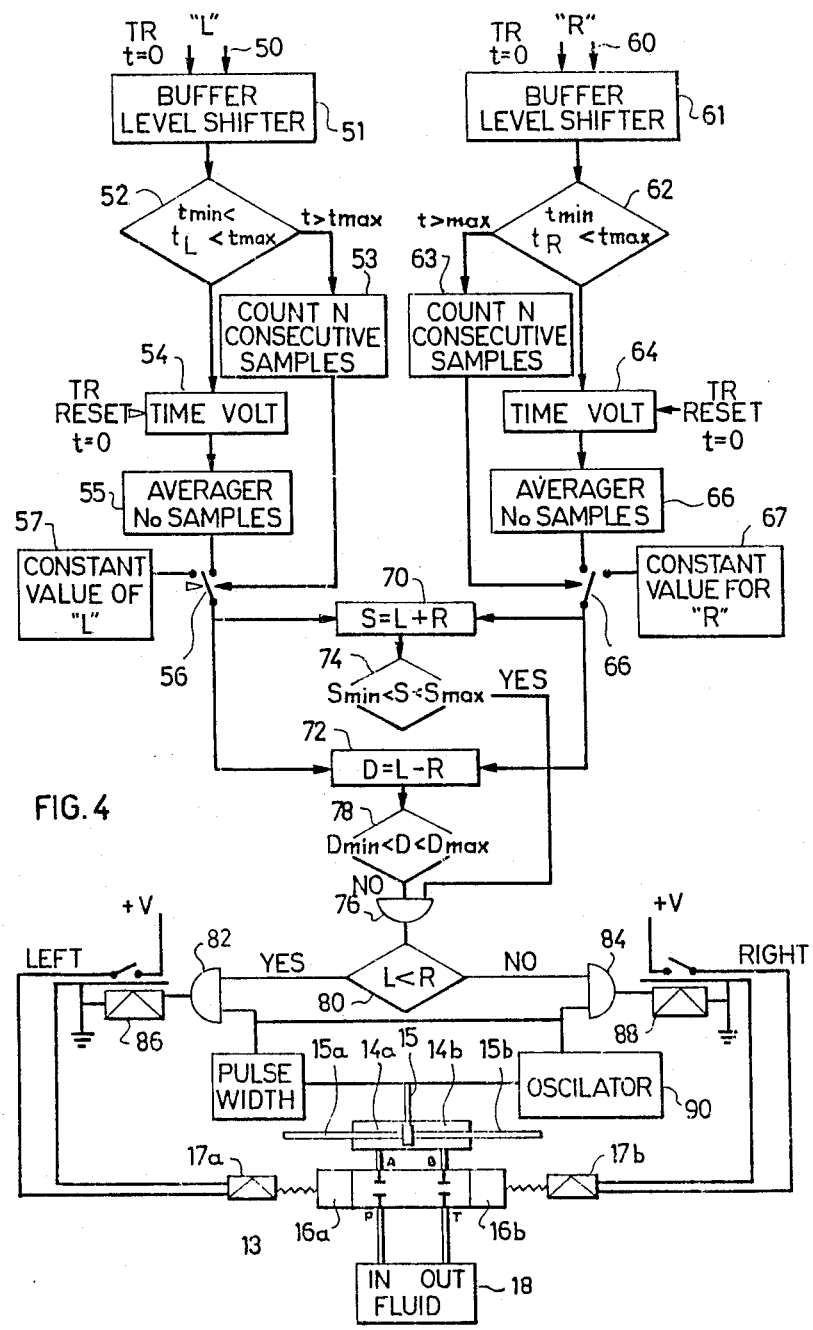
FIG. 4 is a block diagram of a specific implementation of the control box in the positioning system of FIG. 2.

FIG. 4 illustrates the system included within the control unit 12 and positioning device 13 for precisely positioning the agricultural implement 2 in response to the signals received by the left and right sensors 21, 22. As shown in FIG. 4, the signals from each of these sensors is processed in a separate channel, designated 50 and 60, respectively.

Each channel 50, 60 transmits a series of pulses from oscillator 44 through the sensor control 41, 42 (FIG. 3), periodically samples the echoes received, and measures the transit time of the received echo starting from the time of transmission of the respective pulse. Each channel thus receives, the transmission pulses from the respective sensor 21, 22 (FIG. 3) for determining each sample start time (t=0), and the echoes received with the samples from the two channels 50, 60:

The received echo pulses first pass through a buffer and level-shifter circuit 51, 62, and then through a comparison circuit 52, 62 which determines whether the incoming echo pulse has a transit time (measured from the time of transmission of the respective pulse, t=0) which is within a predetermined threshold, i.e., above predetermined minimum and below a predetermined maximum. If the transit time of the arrived echo pulse exceeds the predetermined maximum, the sample is considered "illegal", meaning that no row was detected. The "illegal" samples are counted by a counter 53, 63 for a purpose to be described below.

With respect to each "legal" echo pulse received, i.e. one determined to have a transit time less than the predetermined maximum, the transit time is converted by a converter 54, 64, into a voltage from the time of transmission of the original pulse (t=0). This voltage is inputted into an averaging circuit 55, 65 which accumulates and averages a predetermined number ($N_0$) of the legal samples. The average values of transit times are thenceforth used for the further processing, as described below.

The "illegal" samples ar counted in counter 53, 63 and are used to control a switching device 56, 66, for switching in a constant value for the transit time, from a constant value source 57, 67, instead of the measured transit time value. Thus, if a sensed crop row (6a, 6b, FIG. 1) is completely or partially missing, all the pulse echoes received from the respective sensor 21, 22 will have transit times exceeding the predetermined maximum for the interval during which the respective sensor 21, 22 (FIG. 3) traverses the missing part of the row. When a predetermined number of these "illegal" consecutive samples is counted by its respective counter 53, a determination is made that the respective crop row is completely or partially missing; and as soon as this determination is made, its respective switch 56, 66 switches in a constant value from its respective circuit 57, 67 to be used for further processing, instead of the average value received from the averaging circuit 55, 65. In this manner, the positioning system will be effective to steer the agricultural implement 2 even when a row is completely or partially missing.

The average transit times from the averaging circuits 55, 65 of the two channels (or the constant value from the respective source 57, 67 if switched in when a row is completely or partially missing, as described above), are both inputted into a first logical circuit 70 which adds the two values (S=L+R), and also into a second logical circuit 72 which subtracts the two values (D=L−R). The sum of the two values (representing the distance between the two rows 6a, 6b) from circuit 70 is inputted into a comparator 74 in order to determine whether the sum is above a preselected minimum and below a preselected maximum: and only if "yes", is an output produced to an AND-gate 76. The output of logical circuit 72, representing the difference between the left transit time and the right transit time, is inputted into another comparator circuit 78 to determine whether this difference is above a predetermined minimum (usually negative) value and below a predetermined maximum value; and only if "no" is an output produced to the AND-gate 76.

When AND-gate 76 simultaneously receives both of the above-described outputs from logical circuits 74 and 78, a command is transmitted to another logical circuit 80 serving as a correction direction detector, which opens an AND-gate 82 if the distance measured by the left sensor is less than that of the right sensor 22 (FIG. 2); and if not, it opens another AND-gate 84. The two AND-gates 82, 84 control the application to relays 86, 88 of correction pulses generated by an oscillator 90 and fed to the relays via a circuit 92 which adjustably presets the width of the pulses. Relays 86, 88 control hydraulic valves 16a, 16b via solenoids 17a, 17b. These valves control the flow of the fluid from a pressurized fluid source 18 into chambers 14a, 14b of cylinder 14, so as to control the position of piston 15 within the cylinder. As described earlier, piston 15 is coupled by piston rods 15a, 15b to the agricultural implement 2 so as to move the implement transversly with respect to the boom 13a, (FIG. 1), and thereby to precisely position the agricultural implement with respect to all the crop rows 6a–6f.

It will thus be see that when the distance measured by the left channel (L) 50 is greater than the distance measured by the right channel (R) 60, the correction direction detector 80 will be actuated so as to open gate 82 to pass the correction pulses from oscillator 90 to the relay 86. Such correction pulses operate hydraulic valves 16a, 16b to move piston 15 within cylinder 14 in the direction to decrease the distance "L" and to increase the distance "R", until the two distances are equalized; and as soon as this occurs, the correction direction detector 80 terminates the application of the correction pulses to relay 86. It will also be seen that if the deviation is in the other direction, the correction pulses from oscillator 90 will be applied to relay 88 in order to control piston 15 to move the agricultural implement in the other direction until the "L" and "R" distances are equal (i.e., within a threshold range determined by comparator 78) at which time the application of the correction pulses will be terminated.

The control system illustrated in FIG. 4, particularly the logical circuits 70, 72, 74, 76, and 78, for controlling the correction direction detector 80 and 90, 92 controlling the piston movement, has been found to provide sufficient damping for the control system. The described arrangement wherein a plurality of "legal" samples are averaged in the averaging circuit 55, 65, and are used for controlling the positioning device 13, has been found to be very effective in the presence of a variable density of the plants in the rows, and also in the case of wide plants wherein the measured distances differ from one sample to another.

The arrangement including the counting of consecutive "illegal samples" in counters 53 and 63, and using that count for controlling switches 56, 66 in order to apply a constant value for "L" and "R" instead of the measured average values, has been found to be effective to properly position the agricultural implement even when a row is partially or completely omitted, as frequently occurs in row crops.

Figure 5:
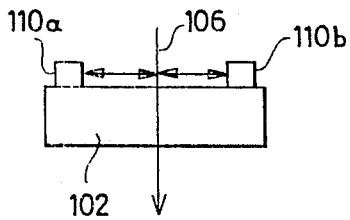
FIG. 5 diagramatically illustrates the application of the systems of FIG. 1–4 for positioning an agricultural implement (or other movable body) along a reference path constituted of a single row of crops.

Embodiment of FIG. 5

Instead of using two rows of crops as the reference path, the system may also use one row of crops, or other single line of objects or a linear object (e.g. a wall or fence) as the reference path. In such a case, the movable body (e.g. the agricultural implement) straddles the single line or row and is positioned so as to be spaced at equal distances on the two opposite sides thereof.

This is diagramatically illustrated in Fig. 5, wherein it will be seen that the agricultural implement 102 straddles a single row of crops 106, and includes two distance-measuring devices 110a and 110b on opposite sides of the crop row 106. Each of the two distance-measuring devices 110a, 110b includes a receiver or other sensor for receiving two input signals, one input signal representing the distance of device 110a from one side of the crop row 106, and the other input signal to device 110b representing the distance of that device from the other side of the crop row 106. The two input signals 110a, 110b are processed in two separate channels in the same manner as described above so as to equalize these two distances. Thus, precisely positions the agricultural implement 102 with respect to the single row of crops 106, and thereby with respect to all the other rows of crops which are precisely located with respect to crop row 106.

Figure 6A:
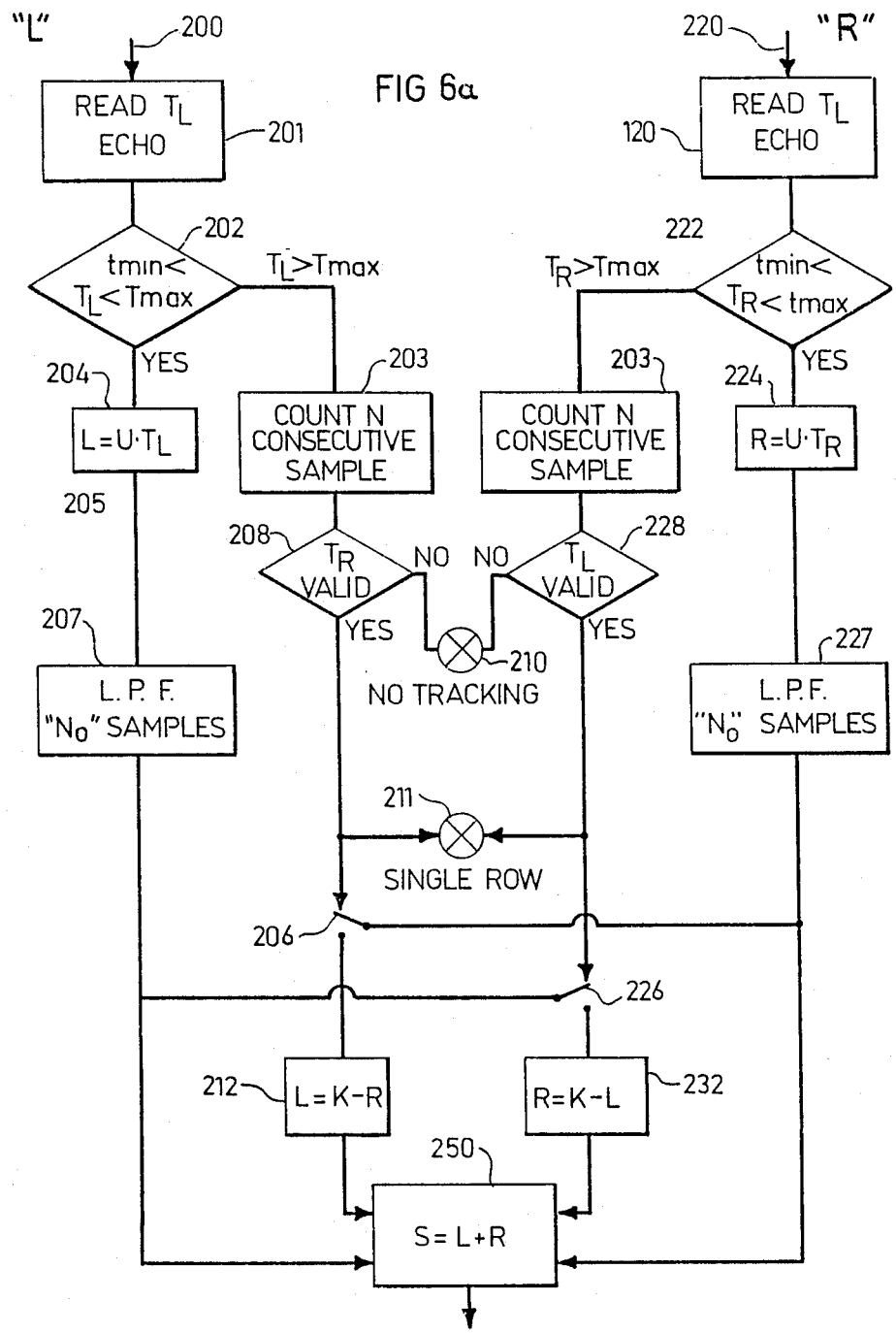

Embodiment of FIG. 6a and 6b

FIGS. 6a, 6b are a block diagram illustrating another implementation of the control box in the system of FIG. 2, particularly in the comparing means for comparing the measured distances in the two channels (corresponding to channels 50 and 60 in FIG. 4) in order to correct for any deviations of the agriculture implement from the reference path. The left channel (channel L) in FIG. 6a, corresponding to channel 50 in FIG. 4, is identified by the reference number 200; whereas the right channel (channel R), corresponding to channel 60 in FIG. 4, is identified by the reference number 220 in FIG. 6a.

Thus, as described above with respect to FIG. 4, each channel 200, 220 transmits a series of pulses from oscillator 44 throught the sensor control circuit 41, 42 (FIG. 3), periodically samples the echoes received, and measures the transmit time of the received echo starting from the time of transmission of the respective pulse. Each channel thus receives the transmission pulses from the respective sensor (21, 22, FIG. 3) for determining each sampe start time (T=0), and the echoes of the respective samples.

The logic circuit for processing the received data can be implemented by analog logic, by digital logic, and also by a simple processor. FIGS. 6a, 6b, as FIG. 4, illustrate a digital logic implementation for purposes of example.

The received echo pulses 200, 220, first pass through circuits 201, 221, which measure the delay time from the instant of transmission (T=0) to the instant of reception of the echo; this time is indicated as $T_L$ with respect to channel 200, and as $T_R$ with respect to channel 220. The received signals are then examined by comparators 202, 222, respectively, to determine whether the echo pulse is a "legal" one, that is, coming within a predetermined window specified by maximum and minimum thresholds. The pulses representing "illegal" times $T_L$, $T_R$, (i.e. outside this window), are fed to counters 203, 223, respectively, for a purpose to be described more particularly below.

The "legal" time pulses are fed to circuits 204 and 224, respectively, wherein the signal sample is converted to distance. This is done by multiplying the time ($T_L$, $T_R$) of the respective sample by the velocity of propagation of sound (U) at the temperature and humidity of the respective sample. Thus, the distance in channel 200, indicated as L, is equal to the product of U and $T_L$ ($L = U \cdot T_L$); and the distance R in channel 220 is equal to the product of U and TR ($R = U \cdot T_R$)

The distances L and R are then entered into an averaging circuit 207, 227, respectively, which continuously produces a value equal to the average value of the last predetermined number (N) of samples. The average values from the two averaging circuits 207, 227, are continuously fed to a summing circuit 250, which produces a sum (S) of the average distances L and R.

As mentioned earlier, the "illegal" samples from comparators 202, 222 are fed to counters 203, 223, respectively. The contents of counters 203, 223, are examined by comparators 208, 228, respectively. Comparators 208, 228 determine that $T_R$ and $T_L$ are not valid whenever the count of consecutive "illegal" samples in the respective counter exceeds the predetermined number "N".

When both $T_R$ nor $T_L$ are thus determined to be invalid, meaning there is a missing stretch along both rows of the crops, a "No Tracking" lamp 210 is energized, and no correction of the system is made; that is, the agricultural implement continues in its path without correction, but this fact is indicated by the "No Tracking" lamp being energized.

If either $T_R$ or $T_L$, but not both, is determined to be invalid, meaning that there is a missing stretch in one crop row, then the "Single Row" tracking lamp 211 is energized; also the respective distance L, R for the "invalid" time is determined, not from the averaging circuits 207, 227, but rather from circuits 212, 232, by subtracting a preselected value "k", representing the pre-measured distance between the two rows of crops, from the measured value in the other channel.

Thus, if circuit 208 determines that the L-channel 200 has sensed N consecutive "illegal" samples, the Single Row lamp 211 is energized, and switch 206 is actuated. The energization of lamp 211 indicates that the system is now tracking a single row. The actuation of switch 206 connects the value R from averaging circuit 227 of channel 220 to subtractor circuit 212, where this value is subtracted from the preselected measure distance "k", to determine the distance L; this distance is inputted into the summing circuit 250 for computing the sum S from the distances L and R. Similarly if N consecutive "illegal" samples have been sensed by the sensor in R-channel 220, its circuit 228 will energize the Single Row lamp 211, and will also actuate switch 226 to connect averaging circuit 207 to subtractor circuit 232, whereby the distance R will be determined by subtracting the distance L from the premeasured distance "k", before the measured distance R is introduced into the summing circuit 250.

The summing circuit 250 adds the distances L and R to produce the sum S. A comparator 251 examines sum S to determine whether it is above a predetermined sum minimum $S_{min}$ and below a predetermined sum maximum $S_{max}$; if not, no correction is effected and the "No Tracking" lamp 210 is energized.

If, however, the sum is between the specified minimum and maximum, the distances L and R are then fed to a subtractor circuit 253 which subtracts distance R from distance L to produce the difference D. This difference D (in absolute terms) is then compared with a specified minimum difference $D_{min}$ and if it does not exceed the specified minimum, no correction is effected If, however, the difference D is above the specified minimum $D_{min}$, this difference D is then examined by a comparator circuit 255 to determine whether the difference is positive or negative; if positive, it actuates relay 86 via AND-regulator gate 82, and if negative, it actuates relay 88 via AND-regulator gate 84. Relays 86 and 88 correspond to the same-numbered relays in FIG. 4 and control the positioning the agricultural implement in the same manner as described above with respect to FIG. 4 via the elements identified by the same reference numerals as in FIG. 4.

While the invention has been described with respect to using sonar pulse-echo distance-measuring devices, it will be appreciated that the invention could also include other forms of distance-measuring devices, for example the variable-frequency type or the variable-amplitude type. In addition, instead of using sonar pulses, the invention could use electromagnetic signals, such as radar pulses. Further, while the invention has been described i connection with positioning an agricultural implement with respect to one or more rows of crops, it will be appreciated that the invention could be used in other applications wherein a movable body is to be positioned with respect to a reference path of travel, for example with respect to a wall or a fence.

Many other variations, modifications and applications of the invention will be apparent.

What is claimed is:

1. A positioning system for positioning a movable body with respect to a reference path constituted of at least one line of subjects or a linear object, comprising:
    a signal-echo distance-measuring device to be located on the movable object and including receiver means for receiving two input signals, one input signal representing the distance of the movable object in one direction from the reference path, and the other input signal representing the distance of the movable object in the opposite direction from the reference path;
    comparing means for comparing both measured distances;
    a positioning device for positioning the movable object towards or away form the reference path;
    and a control system controlling the positioning device in response to said comparing means for controlling the movable object to equalize said two measured distances;
    said reference path being defined by a single line of objects or a single linear object, and said movable body straddling said reference path and being maintained at equal distances from the two opposite sides of said reference path.

2. A positioning system for positioning an agricultural implement with respect to a reference path defined by one or more rows of crops, comprising:
    a signal-echo distance-measuring device to be located on the agricultural implement and including receiver means for receiving two input signals, one input signal representing the distance of the agricultural implement in one direction from the reference path, and the other input signal representing the distance of the agricultural implement in the opposite direction from the reference path;
    comparing means for comparing both measured distances;
    a positioning device for positioning the movable object towards or away from the reference path;
    and a control system controlling the positioning device in response to said comparing means for controlling the agricultural implement to equalize said two measured distances.

3. The positioning system according to claim 2, wherein said reference path is defined by at least two rows of crops, and said positioning device maintains said agricultural implement precisely centered with respect thereto.

4. The positioning system according to claim 2, wherein said reference path is defined by a single line of objects or a single linear object, and said movable body straddles said reference path and is maintained at equal distances from the two opposite sides of said reference path.

5. The positioning system according to claim 1, wherein said signal-echo distance measuring device includes two channels each including a sensor receiving and processing one of said two input signals representing the distance of the two sensors from said one or more rows of crops.

6. The positioning system according to claim 5, wherein each of said two channels includes averaging means for averaging a plurality of said measured distances and for transmitting the average value to said comparing means.

7. The positioning system according to claim 6, wherein each of said channels includes a comparator to determine that each measured distance is above a selected minimum and below a preselected maximum, and means for inputting into said averaging means only such measured distances so determined by said comparator.

8. The positioning system according to claim 7, wherein each of said channels further includes a counter counting the number of measured distances which are above the preselected maximum, and when said latter count in either channel exceeds a predetermined number, transmitting to said comparing means substitute value based on a preselected fixed value, rather than the average measured value, for the respective channel.

9. The positioning system according to claim 8, wherein said comparing means comprises:
    a first logical circuit for adding the measured distances of the two channels;
    a second logical circuit for subtracting the measured distances of the two channels;
    a first comparator to determine whether the sum of the two measured distances is above a predetermined minimum and below a predetermined maximum;
    a second comparator to determine whether the difference between the two measured distances is above a predetermined minimum and below a predetermined maximum;
    a third comparator to determine the channel having the larger measured distance;
    and a gating means actuated by said third comparator only if the output of the first comparator is above a predetermined minimum and below a predetermined maximum, and the output of said second comparator is not above a predetermined minimum and below a predetermined maximum.

10. The positioning system according to claim 8, wherein said reference path is defined by two rows of crops between which said agricultural implement is to be positioned, and wherein said preselected fixed value is the premeasured distance (k) between the two rows of crops; said comparing means comprising:
    a first circuit for determining the distance (L) of one sensor from one row of crops by subtracting from said preselected fixed value (k) the distance (R)

measured from the other sensor to the other row of crops;

a second circuit for determining the distance (R) from the other sensor to the other row of crops by subtracting from said preselected fixed value (k) the distance (L) measured from the one sensor to the one row of crops;

a summing circuit for adding the distance L and R to produce the sum S;

a first comparator for determining whether the sum S is above a predetermined minimum ($S_{min}$) and below a predetermined maximum ($S_{max}$);

a subtracting circuit effective, when said first comparator circuit effective, when said first comparator determines that S is above $S_{min}$ and below $S_{max}$, for subtracting distance R from distance L to produce the difference D;

a second comparator for determining whether the difference D is above a predetermined minimum ($D_{min}$);

a third comparator, effective when D is above $D_{min}$, to determine whether the difference is positive or negative;

and gating means controlling said control system and positioning device to position the agricultural implement in one direction when said difference D is positive, and in the opposite direction when said difference D is negative.

11. The positioning system according to claim 1, wherein said control system comprises:

an oscillator generating correction pulses;

a hydraulic device for controlling said positioning means in each direction;

and a gate for said hydraulic device for feeding said correction pulses thereto under the control of said comparing means to equalize the measured distances on the opposite sides of the distance-measuring device to the adjacent rows of crops.

12. The positioning system according to claim 11, wherein said hydraulic device comprises:

a cylinder and a piston displaceable therein;

a pair of valves controlling the displacement of the piston in either direction within the cylinder;

and a relay controlling each of said valves and connected by its respective gate to receive the correction pulses outputted by said oscillator.

13. The positioning system according to claim 2, wherein said signal-echo distance-measuring device transmits and receives sonar pulses.

14. A positioning system for positioning an agricultural implement with respect to a reference path constituted of at least one row of crops, comprising:

a signal-echo distance-measuring device to be located on the agricultural implement and including a pair of sensors for measuring the distance of the agricultural implement in one direction or the opposite direction from the reference path;

comparing means for comparing both measured distances;

a positioning device, for positioning the agricultural implement towards or away from the reference path;

and a control system controlling the positioning device in response to said comparing means for controlling the agricultural implement to equalize said two measured distances.

15. The positioning system according to claim 14, wherein said reference path is defined by two rows of crops, and said positioning device maintains said agricultural implement precisely centered with respect thereto.

16. The positioning system according to claim 14, wherein each of said two channels includes averaging means for averaging a plurality of said measured distances and for transmitting the average value to said comparing means.

17. The positioning system according to claim 14, wherein each of said channels includes a comparator to determine that each measured distance is above a preselected minimum and below a preselected maximum, and means for inputting into said averaging means only such measured distances so determined by said comparator.

18. The positioning system according to claim 14, wherein each of said channels further includes a counter counting the number of measured distances which are above the preselected maximum, and when said latter count in either channel exceeds a predetermined number, transmitting to said comparing means substitute value based on a preselected fixed value, rather than the average measured value, for the respective channel.

19. The positioning system according to claim 18, wherein said preselected fixed value is the premeasured distance (k) between two rows of crops; said comparing means comprising;

a first circuit for determining the distance (L) of one sensor from one row of crops by subtracting from said preselected fixed value (k) the distance (R) measured from the other sensor to the other row of crops;

a second circuit for determining the distance (R) from the other sensor to the other row of crops by subtracting from said preselected fixed value (k) the distance (L) measured from the one sensor to the one row of crops;

a summing circuit for adding the distances L and R to produce the sum S;

a first comparator for determining whether the sum S is above a predetermined minimum ($S_{min}$) and below a predetermined maximum ($S_{max}$);

a subtracting circuit effective, when said first comparator determines that S is above $S_{min}$ and below $S_{max}$, for subtracting distance R from distance L to produce the difference D;

a second comparator for determining whether the difference D is above a predetermined minimum ($D_{min}$);

a third comparator, effective when D is above Dmin, to determine whether the difference is positive or negative;

and grating means controlling said control system and positioning device to position the agricultural device to position the agricultural implement in one direction when said difference D is positive, and in the opposite direction when said difference D is negative.

20. The positioning system according to claim 14, wherein said signal-echo distance-measuring device transmits and receives sonar pulses.

* * * * *